United States Patent
Patino et al.

(10) Patent No.: US 10,140,787 B2
(45) Date of Patent: Nov. 27, 2018

(54) METHOD AND DEVICE FOR DETERMINING WHETHER AN ERROR CONDITION IS PRESENT OR NOT IN A MOTOR VEHICLE

(71) Applicant: Robert Bosch GmbH, Stuttgart (DE)

(72) Inventors: Isidro Corral Patino, Stuttgart (DE); Evgeniya Ballmann, Stuttgart (DE); Bernd Mueller, Leonberg (DE); Andreas Grimm, Tiefenbronn-Muehlhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 40 days.

(21) Appl. No.: 15/237,022

(22) Filed: Aug. 15, 2016

(65) Prior Publication Data
US 2017/0046887 A1 Feb. 16, 2017

(30) Foreign Application Priority Data

Aug. 14, 2015 (DE) .......................... 10 2015 215 546

(51) Int. Cl.
*G07C 5/08* (2006.01)
*G05B 17/02* (2006.01)

(52) U.S. Cl.
CPC .......... *G07C 5/0816* (2013.01); *G05B 17/02* (2013.01); *B60Y 2200/92* (2013.01); *B60Y 2306/15* (2013.01)

(58) Field of Classification Search
None
See application file for complete search history.

(56) References Cited

U.S. PATENT DOCUMENTS

| | | | | |
|---|---|---|---|---|
| 2008/0071450 A1* | 3/2008 | Kurrle | .................. | F16D 48/066 701/67 |
| 2013/0306027 A1* | 11/2013 | Tobail | .................. | F02D 41/008 123/349 |
| 2014/0309806 A1* | 10/2014 | Ricci | ...................... | B60Q 1/00 701/1 |
| 2016/0104329 A1* | 4/2016 | Sundareswara | ....... | G01M 17/00 701/33.9 |

FOREIGN PATENT DOCUMENTS

| DE | 44 38 714 A1 | 5/1996 |
|---|---|---|
| WO | 2011/072661 A1 | 6/2011 |

OTHER PUBLICATIONS

Dittmann et al. "State Machine Based Method for Consolidating Vehicle Data", Third IFIP TC 10 International Embedded Systems Symposium, IESS 2009, Langenargen, Germany, Sep. 2009, p. 1-11 (Year: 2009).*
Oshana et al. "Software Engineering for Embedded Systems: Methods, Practical Techniques, and Applications", 2013 (Year: 2013).*

* cited by examiner

*Primary Examiner* — Tamara L Weber
(74) *Attorney, Agent, or Firm* — Norton Rose Fulbright US LLP; Gerard Messina

(57) ABSTRACT

A method for determining whether an error is present or not in a motor vehicle, a discrete state, in which the motor vehicle is presently in, being ascertained with the aid of a state machine, a decision being made, depending on the ascertained discrete state, whether an error is present or not, whereby the states of the state machine include acceptable states and unacceptable states, then, if the ascertained discrete state is an unacceptable state, the motor vehicle is transferred into an acceptable state.

7 Claims, 4 Drawing Sheets

1

METHOD AND DEVICE FOR DETERMINING WHETHER AN ERROR CONDITION IS PRESENT OR NOT IN A MOTOR VEHICLE

RELATED APPLICATION INFORMATION

The present application claims priority to and the benefit of German patent application no. 10 2015 215 546.3, which was filed in Germany on Aug. 14, 2015, the disclosure of which is incorporated herein by reference.

FIELD OF THE INVENTION

The present invention relates to a method for determining whether an error condition is present or not in a motor vehicle, in particular in the drive system of the motor vehicle. The present invention furthermore relates to a device, in particular a control unit, which is configured to carry out this method.

BACKGROUND INFORMATION

A method for controlling the drive output of a vehicle is discussed in DE 44 38 714 A1, in which a microcomputer is provided to carry out control functions and monitoring functions. At least two levels independent from one another are thereby established in the microcomputer, a first level carrying out the control function and a second level carrying out the monitoring function.

SUMMARY OF THE INVENTION

A continuous monitoring of the torque may be implemented in that an actually set torque in an internal combustion engine is inferred from the fuel injection times with the aid of a back-calculation, and this torque is compared with an intended torque by the driver derived from the gas pedal position. Such a concept is, however, complex, since a change in the control software of the drivetrain or in the application entails a change in the monitoring software.

Such monitoring is primarily used to secure the safety objective of "preventing unintentional acceleration of the motor vehicle," which is the single safety objective to be covered in motor vehicles driven exclusively by internal combustion engines. Due to the electrification of the vehicle drivetrains, the drivetrain variance, the number of safety objectives, and thus also has the development complexity of the corresponding monitoring functions strongly increased. This development complexity is often traced back to the limited reusability of existing error mechanisms in new drivetrain variants.

According to a first aspect, the present invention relates to a method for determining whether an error is present or not in a motor vehicle or in a subsystem of the motor vehicle, in particular the drive system of the motor vehicle, a discrete state, in which the motor vehicle or the subsystem is presently in, being ascertained with the aid of a state machine, a decision being made, depending on the ascertained discrete state, whether an error is present or not, the motor vehicle then being transferred into an acceptable or safe state if the ascertained discrete state is an unacceptable state. This means, that the motor vehicle is controlled in such a way that the discrete state, in which the motor vehicle is in, and which is ascertained in particular after the controlling, is an acceptable or safe state. Thus, the state machine is transferred into a new discrete state which corresponds to an acceptable state. In particular, it may hereby be provided that every state of the state machine is either acceptable or unacceptable.

The designation "discrete state" is used here in contrast to the term "continuous variable" introduced later. A continuous variable may, during variation between two values, assume arbitrary intermediate values, and is discretized merely for the purposes of its processing in digital technology. Continuous variables are distinguished in that an equality operator, i.e., a comparison whether a first continuous variable is equal to a second continuous variable, makes sense only to a very limited degree because an exact equality of two continuous variables represented in digital technology only occurs if both continuous variables lie close together within the resolution accuracy of the digital representation of the two continuous variables.

By using the provided method, errors may be identified particularly easily by the presence of an unacceptable state and counter measures may be initiated.

The provided method has the advantage that it is particularly easily reusable and scalable, i.e., that it may be expanded particularly easily to other motor vehicle topologies, such as, for example, a hybridized drivetrain. By transferring the operating state into an acceptable state, the method is particularly reliable.

In another aspect, it may be provided that, depending on the ascertained discrete state, a continuous actual operating parameter, which describes an operating state of the motor vehicle, is ascertained or not. Due to this ascertainment, it is possible that additional information is ascertained about the operating state of the motor vehicle, and thus the method is even more reliable.

Ascertaining the continuous actual operating parameter may be hereby understood in particular that this continuous actual operating parameter is actually used in the provided monitoring method. The mere detection of the continuous actual operating parameter generally proceeds permanently, for example, using a sensor.

It may be provided in particular that the continuous actual operating parameter is only ascertained at certain states, for example, only when the ascertained discrete state is acceptable.

The ascertainment of the continuous actual operating parameter may thereby be ascertained with the aid of a characteristic diagram or a mathematical function. Both are methods in which no solver is required for their use. Dispensing with solvers offers a substantial problem solver with regard to modulation capability and scalability. This is due to the fact that the development and calibration of a solver is complex since this must be individually configured for the system of equations to be solved.

In another aspect, it may be provided that, depending on the ascertained continuous actual operating parameter, a discrete unacceptable state is recommended, into which the state machine is to be transferred.

This may occur in an embodiment which is particularly easy to implement, in that the ascertained continuous actual operating parameter is compared to an ascertained setpoint operating parameter, and the discrete unacceptable state is recommended depending on the result of this comparison.

It may then be particularly provided that the state machine is transferred into the recommended discrete unacceptable state, if necessary under the premise that the recommended discrete unacceptable state is checked for plausibility and, depending on the result of this check, the state machine is transferred into the recommended discrete unacceptable state.

In this way, it is possible in a particularly easy way to expand the monitoring of the operating state of the motor vehicle to continuous variables. From the interplay of the state machine and the use of the continuous actual operating parameters, the result arises that the system is intact or that a defect is present, and this defect has been detected by the presence of an unacceptable state in the state machine, or that the defect has been detected as a function of the continuous actual operating parameter. The error coverage ratio is significantly increased by the latter measure.

Depending on the ascertained actual operating parameter, the discrete unacceptable state, into which the state machine is to be transferred, is only recommended, thus, it is possible in a particularly easy way to provide a plausibility check of this error detection mechanism. If the state machine is then transferred into the thus recommended unacceptable state, then the monitoring on the basis of the continuous actual operating parameter is integrated in a particularly easy way into the recommended monitoring on the basis of the state machine.

A method for engine control or a method for brake control, which is monitored using one of the provided methods, is particularly advantageous.

In additional aspects, the present invention relates to a computer program, which is configured to carry out all steps of one of the methods according to one of the previously mentioned aspects, an electronic storage medium, on which the computer program is stored, and a control unit, which is configured to carry out all steps of one of the methods according to one of the previously mentioned aspects.

The figures show particularly advantageous specific embodiments of the present invention by way of example.

DETAILED DESCRIPTION

Figure 1:
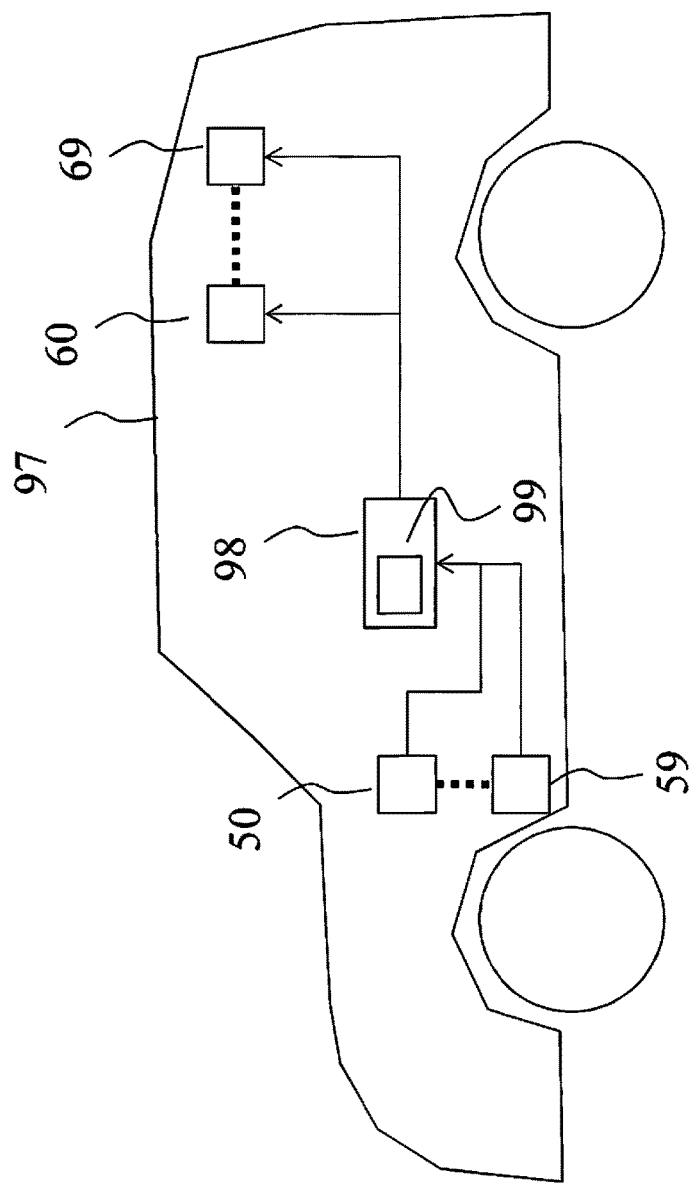
FIG. 1 schematically shows a motor vehicle.

FIG. 1 shows a motor vehicle 97 in which the present invention may be used. The method may, for example, be carried out by a control unit 98, in particular carried out by a computer program which is stored on a machine-readable storage medium 99 which is contained in control unit 98. Control unit 98 hereby receives signals from sensors 50 . . . 59 in a known way and controls actuators 60 . . . 69 on the basis of these sensor signals.

Figure 2:
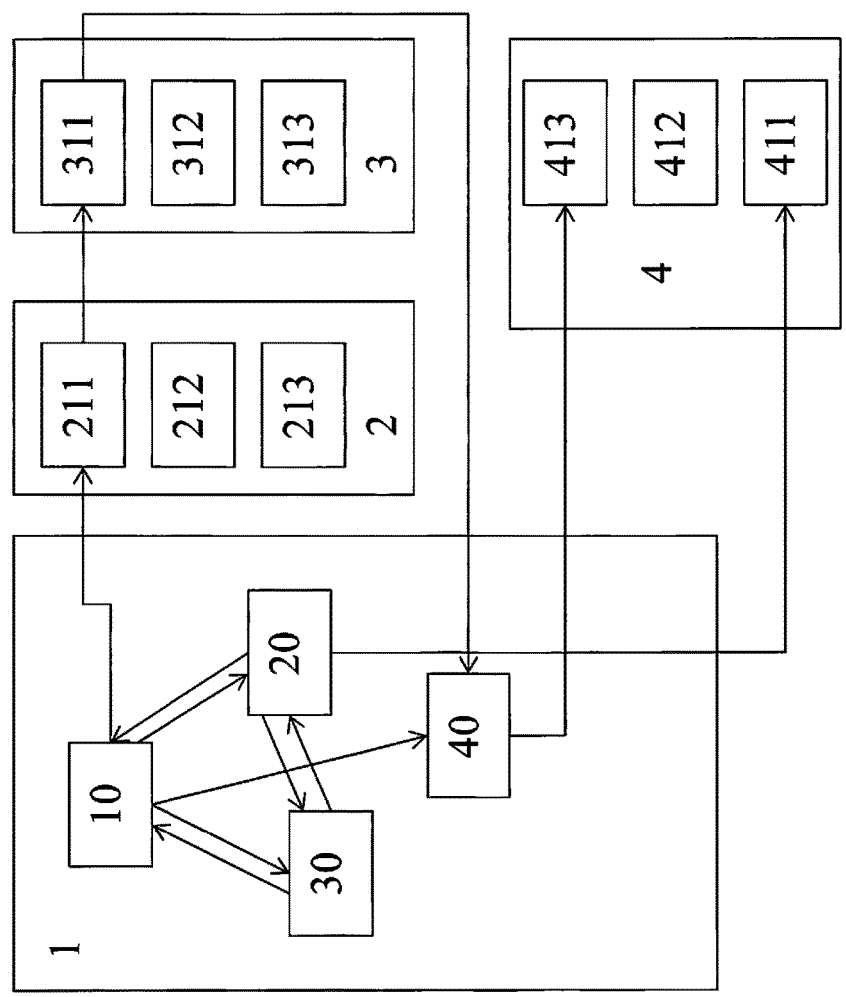
FIG. 2 shows a structure diagram according to a first aspect of the present invention.

FIG. 2 shows a structure diagram which illustrates how the method according to the present invention may progress according to one aspect of the present invention. State machine 1, which includes states 10, 20, 30, is provided. Depending on the ascertained sensor values of sensors 50 . . . 59, state transitions are defined, which transfer state machine 1 from the present state, for example, state 20, into another state, for example, state 10. These states 10, 20, 30 are either acceptable or unacceptable. If the present state, for example state 20, is unacceptable, an error response function 411 is initiated. This causes state 20 to be transferred into another state, for example, into state 10.

The quantity of error response functions 411, 412, 413 is designated as error response block 4. Likewise, monitoring functions 211, 212, 213 are provided in a monitoring block 2, and plausibility check functions 311, 312, 313 in a plausibility check block 3.

State 10 is, for example, an acceptable state. Depending on which state state machine 1 is in, a monitoring function is called up from monitoring block 2, for example, monitoring function 211. This function detects a sensor value, for example, and a speed signal, and compares the value of this signal with a threshold value. Depending on this comparison, a plausibility check function 311 is called up, which ascertains whether the result of this comparison is compatible with the fact that the state machine is in state 10.

If the result is not compatible with the state, the state machine is transferred into unacceptable state 40. Thus, because the state machine is then in unacceptable state 40, error response function 413 is actuated.

Figure 3:
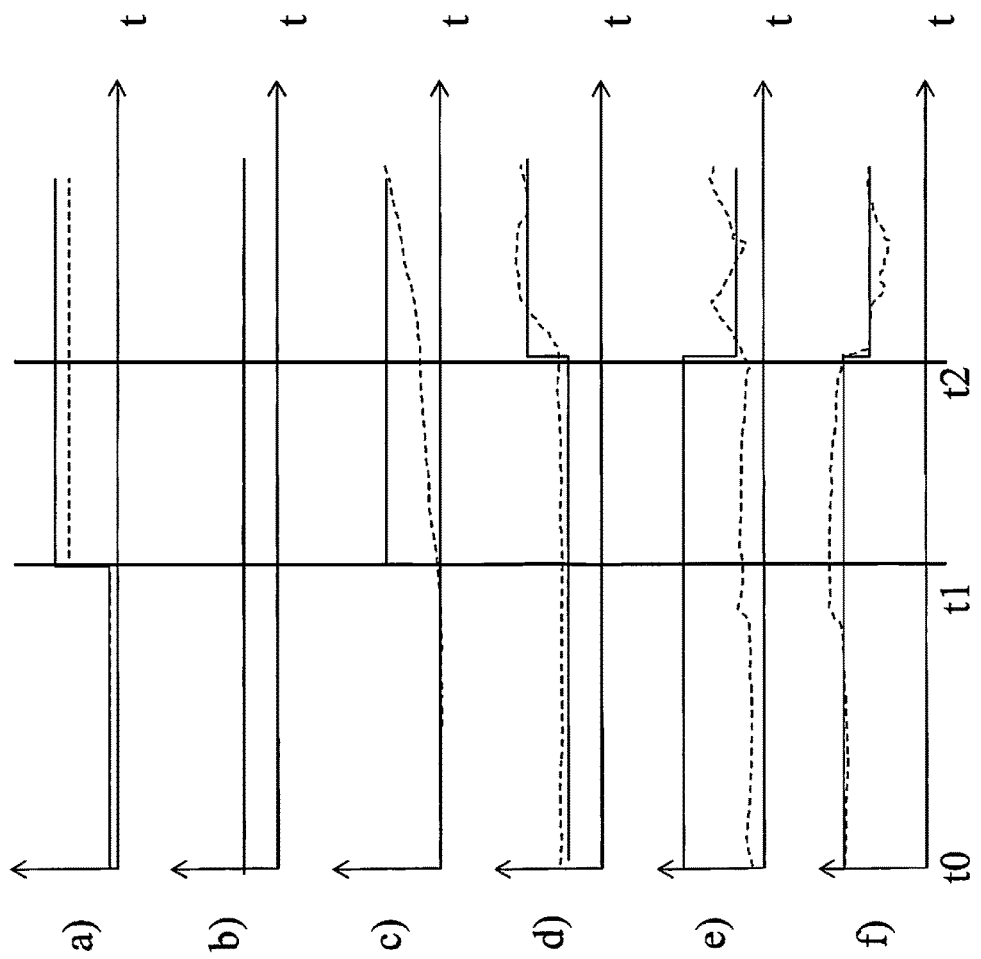
FIG. 3 shows signal curves according to a second aspect of the present invention.

FIG. 3 shows, by way of example, signal curves which lead to an error detection by monitoring block 211. Signal curves actually ascertained in control unit 98 are represented as dashed lines; states recognized in state machine 1 are represented with a solid line. FIG. 3a) shows a gear selection; FIG. 3b) shows a gas pedal position; FIG. 3c) shows a speed of motor vehicle 97; FIG. 3d) shows a speed of an internal combustion engine of motor vehicle 97; FIG. 3e) shows a torque generated by the internal combustion engine; and FIG. 3f) shows a signal of an idle speed controller. The discrete state of the motor vehicle recognized in state machine 1 is, in this example, a tuple of substates, which includes these six states as separate dimensions.

At starting point in time t0, the vehicle is standing. The gear selection state signal shown in FIG. 3a) is in the "park-neutral" state; the gas pedal state signal shown in FIG. 3b) is in the "gas pedal not actuated" state; the speed state signal shown in FIG. 3c) is in the "stopped" state; the rpm state signal shown in FIG. 3d) is in the "idle speed" state; the torque state signal shown in FIG. 3e) is in the "constant torque" state; and the idle speed controller state signal shown in FIG. 3f) is in the "ISC active" state. The recognized discrete state of motor vehicle 97 in state machine 1 thus corresponds to the state ("park-neutral," "gas pedal not actuated," "stopped," "idle speed," "constant torque," "ISC active"). This state corresponds to state 30 in FIG. 2.

At a point in time t1, a gear is engaged and the gear selection state signal (FIG. 3a) jumps into the "drive" substate, since it has been recognized that the gear selection signal is changed to "1$^{st}$ gear." The gas pedal state signal (FIG. 3b) remains in the "gas pedal not actuated" substate, since it has been recognized that the gas pedal signal remains at the value "0%." The speed state signal (FIG. 3c) jumps to the "in motion" substate, since it has been recognized that the speed signal has exceeded a predefinable minimum speed. The rpm state signal (FIG. 3d) remains in the "idle speed" substate, since it has been recognized that the rpm signal is not greater than a predefinable minimum rpm. The torque state signal (FIG. 3e) remains in the "constant torque" substate, since it has been recognized that the torque signal has changed by not more than a predefinable minimum torque change. The idle speed controller state signal (FIG. 3f) remains in the "ISC active" substate. From point in time t1, the recognized discrete state of motor vehicle 97 in state machine 1 thus corresponds to the state ("drive," "gas pedal not actuated," "in motion," "idle speed," "constant torque," "ISC active"). This state corresponds to state 10 from FIG. 2. In this state, monitoring function 211 is actuated for monitoring the rpm of the internal combustion engine and for monitoring the torque signal.

At another point in time t2, the gear selection state signal (FIG. 3a), the gas pedal state signal (FIG. 3b), and the speed state signal (FIG. 3c) remain unchanged with respect to point in time t1. The rpm signal (FIG. 3d) increases, and monitoring function 211 recognizes that the rpm exceeds the idle speed. Monitoring function 211 therefore recommends to transfer the rpm state signal into the "rpm greater than idle speed" substate, since it has been recognized that the rpm signal is greater than the predefinable minimum rpm. Monitoring function 211 also recommends to transfer the torque state signal into the "increasing torque" state, since an increase of the torque signal has been recognized. Monitoring function 211 also recommends to transfer the idle speed controller state signal (FIG. 3f) into the "ISC not active" state, since it has been recognized that the idle speed controller signal fell below a predefinable idle speed controller activation degree. Monitoring function 211 thus recommends to transfer the recognized discrete state of motor vehicle 97 in state machine 1 into the state ("drive," "gas pedal not actuated," "in motion," "rpm greater than idle speed," "increasing torque," "ISC not active").

Plausibility check block 311 permits this transfer. From point in time t2, the recognized discrete state of motor vehicle 97 in state machine 1 therefore corresponds to the state ("drive," "gas pedal not actuated," "in motion," "rpm greater than idle speed," "increasing torque," "ISC not active"). This state corresponds to state 40 in FIG. 2. As a reaction to the state machine transferring into state 40, error response function 413 is called up, which turns off the internal combustion engine.

Consequently, state machine 1 recognizes that the motor vehicle has been transferred into a safe state (not shown in FIG. 2), and the method begins again.

Figure 4:
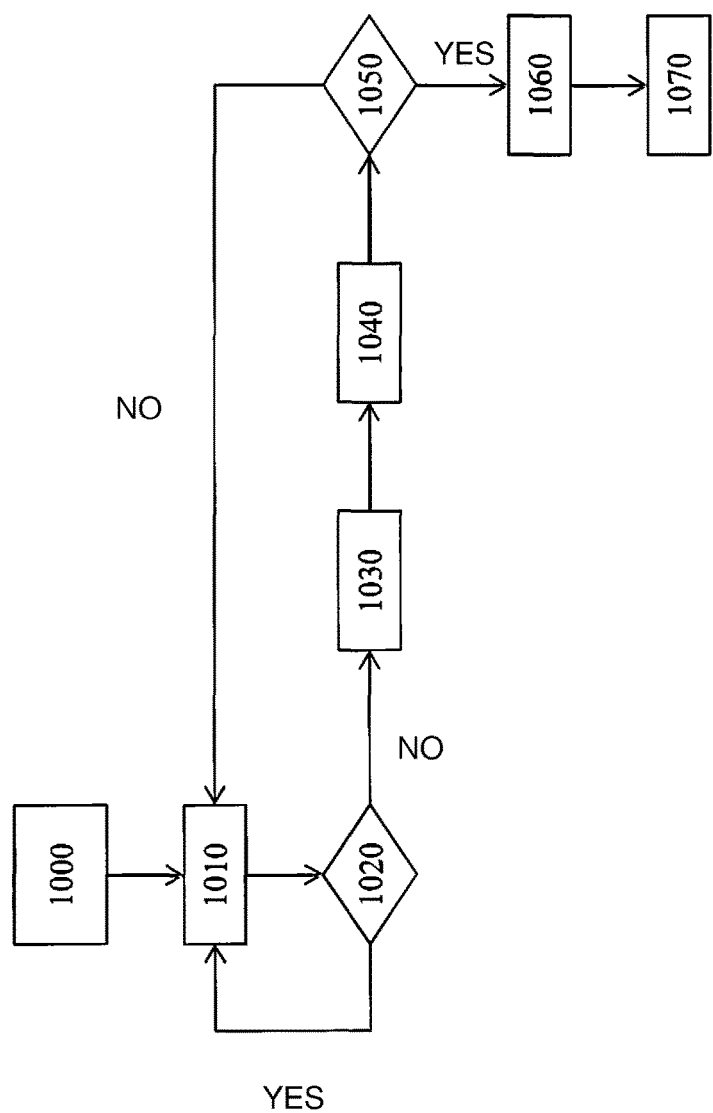
FIG. 4 shows a flow chart of the possible sequence of a specific embodiment of the present invention.

FIG. 4 illustrates the sequence of the method. The method starts in step 1000. In step 1010, the state is ascertained, in which motor vehicle 97 is in, and state machine 1 is transferred into this state.

In subsequent step 1020, it is checked whether this state is an acceptable state. If this is the case, it branches back to step 1010, where the state is updated. If this is not the case, step 1030 follows, in which a monitoring function is actuated. A continuous actual operating parameter, for example the rpm of the internal combustion engine, is detected and compared with a setpoint operating parameter, for example, the nominal idle speed. Additional variables may also be detected and compared in parallel.

Depending on the results of these comparisons, a discrete unacceptable state, into which state machine 1 is to be transferred, is recommended in following step 1040.

Step 1050 follows, in which a plausibility check function ascertains whether this recommended state is plausible with the actual state of state machine 1, for example, whether a transition from the actual state into the recommended state is stored as a possibility in a list in control unit 99. If this is not the case, the method branches back to step 1010.

If, in contrast, this is the case, state machine 1 is transferred into this recommended, discrete, unacceptable state in step 1060.

Step 1070 follows, in which an error response function is called up. The method ends here.

What is claimed is:

1. A method for determining whether an error is present or not in a motor vehicle, the method comprising:
   ascertaining, via a control unit having a state machine, a discrete state, in which a drive system of the motor vehicle is presently in, with the aid of the state machine, wherein the control unit receives sensor signals from sensors of the drive system of the motor vehicle and controls actuators based on the sensor signals; and
   making a decision, via the control unit, depending on the ascertained discrete state, whether an error is present;
   wherein states of the state machine include acceptable states and unacceptable states,
   wherein if the ascertained discrete state is an unacceptable state, initiating an error response function and transferring the drive system of the motor vehicle into an acceptable state,
   wherein, depending on the ascertained discrete state, a continuous actual operating parameter, which describes an operating state of the motor vehicle, is ascertained,
   wherein, depending on the ascertained continuous actual operating parameter, a discrete unacceptable state is recommended, into which the state machine is to be transferred, and
   wherein one of (i), (ii) and (iii) is satisfied:
      (i) the ascertained continuous actual operating parameter is compared with an ascertained setpoint operating parameter, and, depending on the result of this comparison, the discrete unacceptable state is recommended,
      (ii) the state machine is transferred into the recommended, discrete, unacceptable state, and
      (iii) the recommended, discrete, unacceptable state is checked for plausibility and, depending on the result of this check, the state machine is transferred into the recommended, discrete, unacceptable state,
   wherein an error response function is generated if the state machine is transferred into an unacceptable state, and
   wherein the error response function transfers the state to a safe state.

2. The method of claim 1, wherein the ascertained continuous actual operating parameter is compared with the ascertained setpoint operating parameter, and, depending on the result of this comparison, the discrete unacceptable state is recommended.

3. The method of claim 1, wherein the state machine is transferred into the recommended, discrete, unacceptable state.

4. The method of claim 1, wherein the recommended, discrete, unacceptable state is checked for plausibility and, depending on the result of this check, the state machine is transferred into the recommended, discrete, unacceptable state.

5. The method of claim 1, wherein the ascertainment of the continuous actual operating parameter is ascertained with the aid of a characteristic diagram or a mathematical function.

6. A computer readable medium having a computer program, which is executable by a processor of a control unit, comprising:
   a program code arrangement having program code for determining whether an error is present or not in a motor vehicle, by causing the control unit to perform the following:
      ascertaining, via a control unit having a state machine, a discrete state, in which a drive system of the motor vehicle is presently in, with the state machine, wherein the control unit receives sensor signals from sensors of the drive system of the motor vehicle and controls actuators based on the sensor signals; and
      making a decision, via the control unit, depending on the ascertained discrete state, whether an error is present;

wherein states of the state machine include acceptable states and unacceptable states, and wherein if the ascertained discrete state is an unacceptable state, initiating an error response function and transferring the drive system of the motor vehicle into an acceptable state, wherein, depending on the ascertained discrete state, a continuous actual operating parameter, which describes an operating state of the motor vehicle, is ascertained, wherein, depending on the ascertained continuous actual operating parameter, a discrete unacceptable state is recommended, into which the state machine is to be transferred, and wherein one of (i), (ii) and (iii) is satisfied:
(i) the ascertained continuous actual operating parameter is compared with an ascertained set-point operating parameter, and, depending on the result of this comparison, the discrete unacceptable state is recommended,
(ii) the state machine is transferred into the recommended, discrete, unacceptable state, and
(iii) the recommended, discrete, unacceptable state is checked for plausibility and, depending on the result of this check, the state machine is transferred into the recommended, discrete, unacceptable state, wherein an error response function is generated if the state machine is transferred into an unacceptable state, and wherein the error response function transfers the state to a safe state.

7. A control device for determining whether an error is present or not in a motor vehicle, comprising:
a control unit having a processor having a state machine and configured to perform the following:
ascertaining, via the control unit, a discrete state, in which a drive system of the motor vehicle is presently in, with the state machine, wherein the control unit receives sensor signals from sensors of the drive system of the motor vehicle and controls actuators based on the sensor signals; and
making a decision, via the control unit, depending on the ascertained discrete state, whether an error is present;

wherein states of the state machine include acceptable states and unacceptable states, wherein if the ascertained discrete state is an unacceptable state, initiating an error response function and transferring the drive system of the motor vehicle into an acceptable state, wherein, depending on the ascertained discrete state, a continuous actual operating parameter, which describes an operating state of the motor vehicle, is ascertained, wherein, depending on the ascertained continuous actual operating parameter, a discrete unacceptable state is recommended, into which the state machine is to be transferred, and wherein one of (i), (ii) and (iii) is satisfied:
(i) the ascertained continuous actual operating parameter is compared with an ascertained set-point operating parameter, and, depending on the result of this comparison, the discrete unacceptable state is recommended,
(ii) the state machine is transferred into the recommended, discrete, unacceptable state, and
(iii) the recommended, discrete, unacceptable state is checked for plausibility and, depending on the result of this check, the state machine is transferred into the recommended, discrete, unacceptable state, wherein an error response function is generated if the state machine is transferred into an unacceptable state, and wherein the error response function transfers the state to a safe state.

* * * * *